US010904590B2

(12) United States Patent
Jagadish et al.

(10) Patent No.: US 10,904,590 B2
(45) Date of Patent: Jan. 26, 2021

(54) METHOD AND SYSTEM FOR REAL TIME SWITCHING OF MULTIMEDIA CONTENT

(71) Applicant: Otter Network, LLC, Austin, TX (US)

(72) Inventors: Channagiri Jagadish, Mountain House, CA (US); Nicholas J. Tangborn, Austin, TX (US); Harry B. Friedman, II, Austin, TX (US)

(73) Assignee: Otter Network, LLC, Austin, TX (US)

( * ) Notice: Subject to any disclaimer, the term of this patent is extended or adjusted under 35 U.S.C. 154(b) by 62 days.

(21) Appl. No.: 16/421,308

(22) Filed: May 23, 2019

(65) Prior Publication Data

US 2019/0364305 A1 Nov. 28, 2019

Related U.S. Application Data

(60) Provisional application No. 62/675,595, filed on May 23, 2018.

(51) Int. Cl.
| | |
|---|---|
| *H04N 21/2343* | (2011.01) |
| *H04N 21/2187* | (2011.01) |
| *H04N 21/438* | (2011.01) |
| *H04N 21/258* | (2011.01) |
| *H04N 21/235* | (2011.01) |

(52) U.S. Cl.
CPC ..... *H04N 21/2343* (2013.01); *H04N 21/2187* (2013.01); *H04N 21/2358* (2013.01); *H04N 21/25833* (2013.01); *H04N 21/4384* (2013.01)

(58) Field of Classification Search
CPC ......... H04N 21/21805; H04N 21/2187; H04N 21/2343; H04N 21/2358; H04N 21/25825; H04N 21/25833; H04N 21/4384

See application file for complete search history.

(56) References Cited

U.S. PATENT DOCUMENTS

| 10,178,203 | B1* | 1/2019 | Simms | H04N 21/8456 |
| 2009/0165057 | A1* | 6/2009 | Miller | H04N 7/17318 |
| | | | | 725/68 |
| 2012/0143996 | A1* | 6/2012 | Liebald | G06F 15/16 |
| | | | | 709/219 |

(Continued)

*Primary Examiner* — Philip J Chea
*Assistant Examiner* — Mohammed Ahmed
(74) *Attorney, Agent, or Firm* — Kolisch Hartwell, P.C.

(57) ABSTRACT

The present disclosure provides a computer-implemented method and system for real time switching of multimedia content. The computer-implemented method and system corresponds to a multimedia content switching system. The multimedia content switching system receives a first set of data associated with a plurality of users. The multimedia content switching system fetches a second set of data and a plurality of technical parameters. The multimedia content switching system obtains a plurality of multimedia content streams. The multimedia content switching system creates a plurality of groups. The multimedia content switching system enables customization of the plurality of technical parameters. The multimedia content switching system enables switching of the plurality of multimedia content streams based on a right field of view. The multimedia content switching system merges switched multimedia content streams. The multimedia content switching system transfers a single customized multimedia content stream to a live broadcasting platform.

20 Claims, 4 Drawing Sheets

(56) References Cited

U.S. PATENT DOCUMENTS

| | | | |
|---|---|---|---|
| 2012/0233652 A1* | 9/2012 | Drope | G06F 21/6218 |
| | | | 725/114 |
| 2012/0303760 A1* | 11/2012 | Begen | H04N 21/4384 |
| | | | 709/219 |
| 2013/0061035 A1* | 3/2013 | Hook | H04L 9/0822 |
| | | | 713/150 |
| 2013/0318251 A1* | 11/2013 | Mohammad | H04N 21/234327 |
| | | | 709/231 |
| 2014/0259037 A1* | 9/2014 | Belyaev | H04N 21/44008 |
| | | | 725/14 |
| 2015/0249813 A1* | 9/2015 | Cole | H04N 21/21805 |
| | | | 386/241 |
| 2015/0365725 A1* | 12/2015 | Belyaev | H04N 21/8133 |
| | | | 725/46 |
| 2016/0080446 A1* | 3/2016 | Karthikeyan | H04L 65/4076 |
| | | | 709/219 |
| 2016/0227190 A1* | 8/2016 | Cole | H04N 13/239 |
| 2017/0163900 A1* | 6/2017 | Gaetje | H04N 13/332 |
| 2017/0316305 A1* | 11/2017 | Liensberger | H04L 65/4069 |
| 2018/0152737 A1* | 5/2018 | Mathur | H04N 21/234 |
| 2018/0249189 A1* | 8/2018 | Cole | H04N 21/2143 |
| 2019/0045241 A1* | 2/2019 | Alexander | H04N 21/2181 |
| 2019/0075148 A1* | 3/2019 | Nielsen | H04N 21/2668 |
| 2019/0141394 A1* | 5/2019 | Loheide | H04N 21/8456 |
| 2019/0197789 A1* | 6/2019 | Macauley | G11B 27/00 |

* cited by examiner

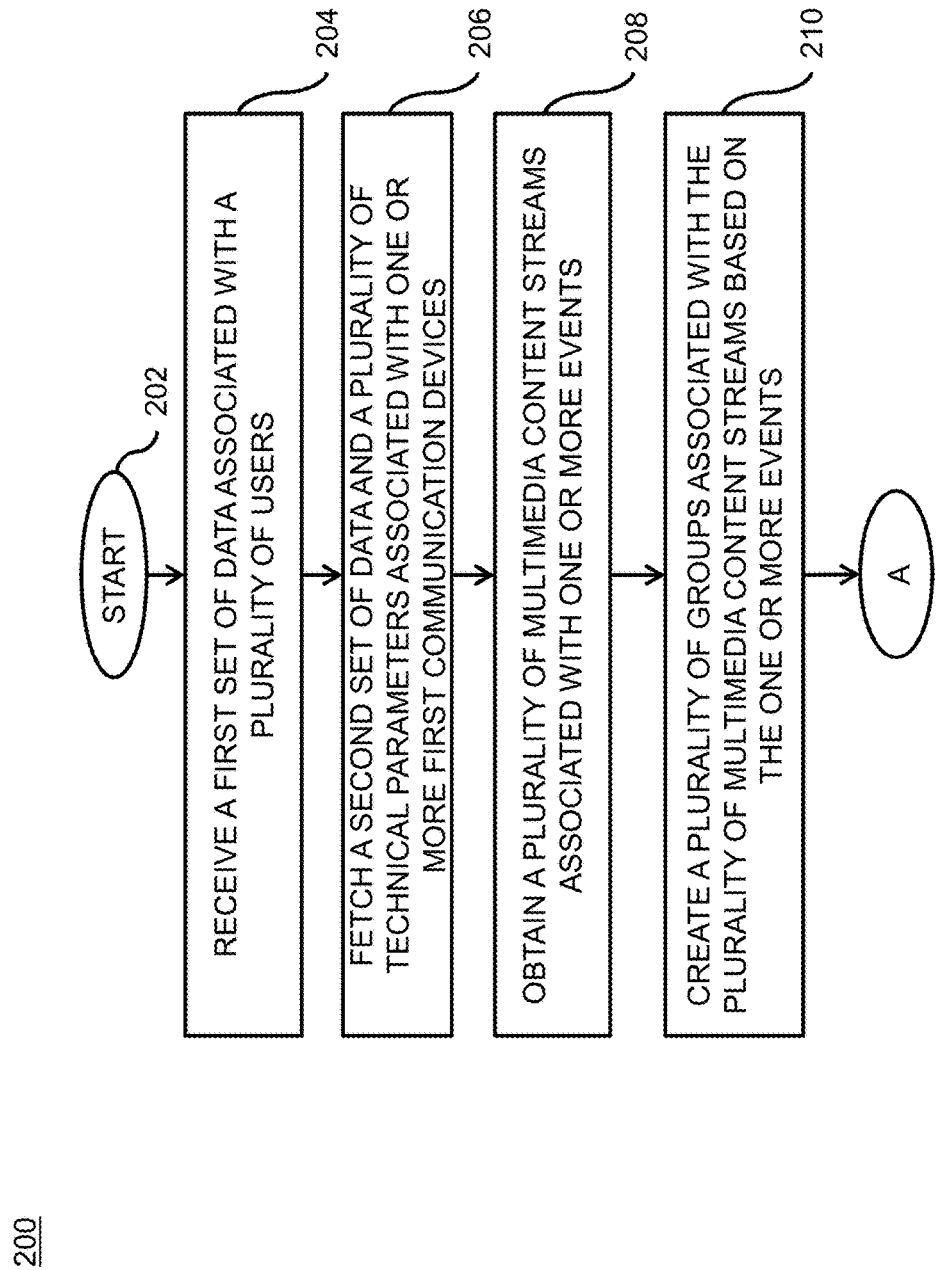

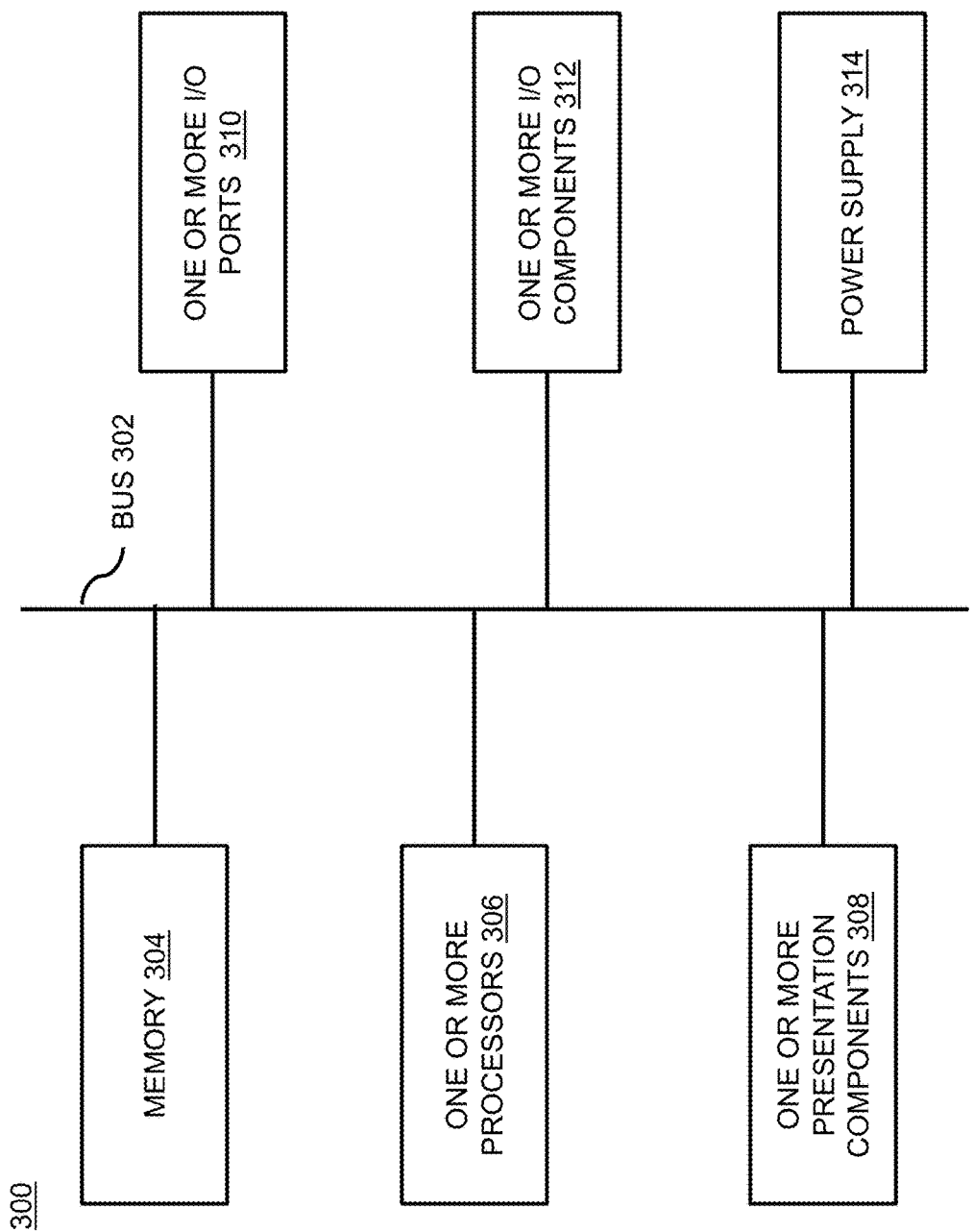

METHOD AND SYSTEM FOR REAL TIME SWITCHING OF MULTIMEDIA CONTENT

CROSS-REFERENCES TO RELATED APPLICATIONS

This application claims the benefit under 35 U.S.C. § 119(e) of U.S. Provisional Patent Application Ser. No. 62/675,595, filed May 23, 2018 and entitled "METHOD AND SYSTEM FOR REAL TIME SWITCHING OF MULTIMEDIA CONTENT", the disclosure of which is herein incorporated by reference.

TECHNICAL FIELD

The present invention relates to the field of multimedia content processing system and, in particular, relates to a method and system for real time switching of multimedia content.

BACKGROUND

Over the past few years, various strategies and hardware systems have been developed to transmit customized multimedia content streams over transmission channels of different bandwidths and reliability. The various strategies and hardware systems include many design parameters that are often application specific. The design parameters may be selected based on a number of considerations, such as the desired size and quality of the received multimedia stream (including resolution, frame rate, color depth, etc.). The efficiency of these designed systems depends on latency between transmitting and receiving the multimedia content stream, reliability of the transmission network(s), and the processing capabilities of the transmitting and receiving devices. Transmission of live broadcasts or near real-time multimedia content stream of acceptable quality is particularly challenging over wireless networks, such as cellular networks. This is due to the relatively low bandwidth and low integrity transmission. In addition, hand-held communication devices, such as cell phones, tablets, and various other hand-held computing/communication devices may have limited processing capabilities and proprietary operating systems. Time-insensitive multimedia content streams that are significantly time-delayed or previously stored allow sufficient processing prior to transmission. The processing facilitates transmission of the multimedia content streams over such networks using appropriate coding and compression strategies. The time-insensitive multimedia content stream often do not actually stream the multimedia content in real time, but allow for a complete segment of multimedia content data to be transmitted to the receiving device prior to processing and playback by the device. As a result, the time-insensitive multimedia content stream systems and applications may not be appropriate for live broadcasts or time-sensitive multimedia content broadcasting. The time-sensitive multimedia content includes real time customized live multimedia content streams.

In light of the above stated discussion, there is a need for a method and system which overcomes the above stated disadvantages.

SUMMARY

In a first example, a computer-implemented method is provided. The computer-implemented method for real time switching of multimedia content. The computer implemented method corresponds to a multimedia content switching system with a processor. The computer-implemented method includes a first step to receive a first set of data associated with a plurality of users. In addition, the computer-implemented method includes a second step to fetch a second set of data and a plurality of technical parameters associated with one or more first communication devices. Further, the computer-implemented method includes a third step to obtain a plurality of multimedia content streams associated with one or more events through the one or more first communication devices from a plurality of field of views. Furthermore, the computer-implemented method includes a fourth step to create a plurality of groups associated with the plurality of multimedia content streams based on the one or more events. Moreover, the computer-implemented method includes a fifth step to enable customization of the plurality of technical parameters associated with the one or more first communication devices based on one or more inputs from one or more directors. The computer-implemented method includes a sixth step to enable switching of the plurality of multimedia content streams associated with corresponding group based on a right field of view of the plurality of field of views according the one or more directors. The computer-implemented method includes a seventh step to merge switched multimedia content streams associated with the plurality of multimedia content streams based on customized technical parameters. The computer-implemented method includes an eighth step to transfer a single customized multimedia content stream to a live broadcasting platform. The first set of data is received in real time. The second set of data and the plurality of technical parameters are fetched in real time. The plurality of field of views is an open observable area associated with the one or more events obtained through the one or more first communication devices. The plurality of groups is created in real time. The one or more directors customize the plurality of technical parameters in real time over one or more second communication devices. The plurality of multimedia content streams switched in real time over the one or more second communication devices. The switched multimedia content streams are merged in real time over a cloud storage associated with the multimedia content switching system with the processor. The single customized multimedia content stream is broadcasted uninterrupted in real time. The single customized multimedia content stream is stored to the cloud storage in real time.

In an embodiment of the present disclosure, the multimedia content switching system is associated with a server. The server provides a plurality of functionalities. The plurality of functionalities includes data sharing, resources sharing, computation performing, task performing, instruction storing, and operation performing. The server includes a database. The database includes information associated with the multimedia content switching system.

In an embodiment of the present disclosure, the first set of data includes user name, user contact number, user email address, user location and user communication device. The first set of data is received from each of the plurality of users. A communication network provides a medium for the plurality of users to connect with the multimedia content switching system through the one or more first communication devices.

In an embodiment of the present disclosure, the second set of data includes megapixels, aperture, sensors, pixel density, screen size, screen resolution and IP address. The plurality of technical parameters includes video codec, audio code, network bandwidth, maximum bitrate limit and minimum bitrate limit.

In an embodiment of the present disclosure, the multimedia content switching system includes a processing module. The processing module creates the plurality of groups. Each of the plurality of groups includes at least two active first communication devices of the one or more first communication devices. The active first communication devices transmit multimedia content stream in real time.

In an embodiment of the present disclosure, the computer-implemented method further assigns the one or more directors to each of the plurality of groups at the multimedia content streams system with the processor. Each of the one or more directors monitors and controls the plurality of multimedia content streams of at least two active communication devices in corresponding group of the plurality of groups through the one or more second communication devices. The one or more directors customize the plurality of technical parameters to enable adaptive bitrate streaming based on the one or more inputs.

In an embodiment of the present disclosure, the computer-implemented method further receives a set of rules at the multimedia content streams system with the processor. The set of rules is received from the one or more second communication devices based on the one or more inputs of the one or more directors. The one or more inputs includes optimal field of view, optimal time, optimal bitrate, optimal aperture, optimal network bandwidth, optimal frame per second and optimal pixel density. The set of rules enables automatic switching of the plurality of multimedia content streams and switching of the plurality of multimedia content streams in defined interval of time.

In an embodiment of the present disclosure, the multimedia content switching system includes the switcher module. The switcher module buffers the plurality of multimedia content streams. The switcher module receives switch signal from the one or more directors. The switcher module enables continuous switching between the plurality of multimedia content streams received from at least two active first communication devices in corresponding group of the plurality of groups. The switcher module includes sufficient buffer to enable the optimized continuous multimedia stream. The switcher module induces a change in bitrate of the plurality of multimedia content streams to adapt to the communication network.

In an embodiment of the present disclosure, the computer-implemented method further detects the right field of view from the plurality of field of views of the plurality of multimedia content streams to switch and merge with previous multimedia stream. The multimedia content switching system enables smooth transition between the plurality of multimedia content streams to enable continuous multimedia content stream.

In an embodiment of the present disclosure, the live broadcasting platform receives the single customized multimedia content stream from the multimedia content switching system. The live broadcasting platform enables live broadcast of the single customized multimedia content stream to a plurality of end user. The plurality of end users accesses the live broadcasting platform with facilitation of communication device. The multimedia content switching system provides customized multimedia content streams to the live broadcasting platform in real time.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method for real time switching of multimedia content. The method corresponds to a multimedia content switching system. The method includes a first step to receive a first set of data associated with a plurality of users. In addition, the method includes a second step to fetch a second set of data and a plurality of technical parameters associated with one or more first communication devices. Further, the method includes a third step to obtain a plurality of multimedia content streams associated with one or more events through the one or more first communication devices from a plurality of field of views. Furthermore, the method includes a fourth step to create a plurality of groups associated with the plurality of multimedia content streams based on the one or more events. Moreover, the method includes a fifth step to enable customization of the plurality of technical parameters associated with the one or more first communication devices based on one or more inputs from one or more directors. Also, the method includes a sixth step to enable switching of the plurality of multimedia content streams associated with corresponding group based on a right field of view of the plurality of field of views according the one or more directors. Also, the method includes a seventh step to merge switched multimedia content streams associated with the plurality of multimedia content streams based on customized technical parameters. Also, the method includes an eighth step to transfer a single customized multimedia content stream to a live broadcasting platform. The first set of data is received in real time. The second set of data and the plurality of technical parameters are fetched in real time. The plurality of field of views is an open observable area associated with the one or more events obtained through the one or more first communication devices. The plurality of groups is created in real time. The one or more directors customize the plurality of technical parameters in real time over one or more second communication devices. The plurality of multimedia content streams switched in real time over the one or more second communication devices. The switched multimedia content streams are merged in real time over a cloud storage associated with the multimedia content switching system. The single customized multimedia content stream is broadcasted uninterrupted in real time. The single customized multimedia content stream is stored to the cloud storage in real time.

In a third example, a non-transitory computer-readable storage medium is provided. The non-transitory computer-readable storage medium encodes computer executable instructions that, when executed by at least one processor, performs a method for real time switching of multimedia content. The method includes a first step to receive a first set of data associated with a plurality of users. In addition, the method includes a second step to fetch a second set of data and a plurality of technical parameters associated with one or more first communication devices. Further, the method includes a third step to obtain a plurality of multimedia content streams associated with one or more events through the one or more first communication devices from a plurality of field of views. Furthermore, the method includes a fourth step to create a plurality of groups associated with the plurality of multimedia content streams based on the one or more events. Moreover, the method includes a fifth step to enable customization of the plurality of technical parameters associated with the one or more first communication devices based on one or more inputs from one or more directors. Also, the method includes a sixth step to enable switching of the plurality of multimedia content streams associated with corresponding group based on a right field of view of the plurality of field of views according the one or more directors. Also, the method includes a seventh step to merge switched multimedia content streams associated with the plurality of multimedia content streams based on customized technical parameters. Also, the method includes an eighth step to transfer a single customized multimedia content stream to a live broadcasting platform. The first set of data is received in real time. The second set of data and the plurality of technical parameters are fetched in real time. The plurality of field of views is an open observable area associated with the one or more events obtained through the one or more first communication devices. The plurality of groups is created in real time. The one or more directors customize the plurality of technical parameters in real time over one or more second communication devices. The plurality of multimedia content streams switched in real time over the one or more second communication devices. The switched multimedia content streams are merged in real time over a cloud storage associated with the multimedia content switching system. The single customized multimedia content stream is broadcasted uninterrupted in real time. The single customized multimedia content stream is stored to the cloud storage in real time.

BRIEF DESCRIPTION OF THE FIGURES

Figure 1:
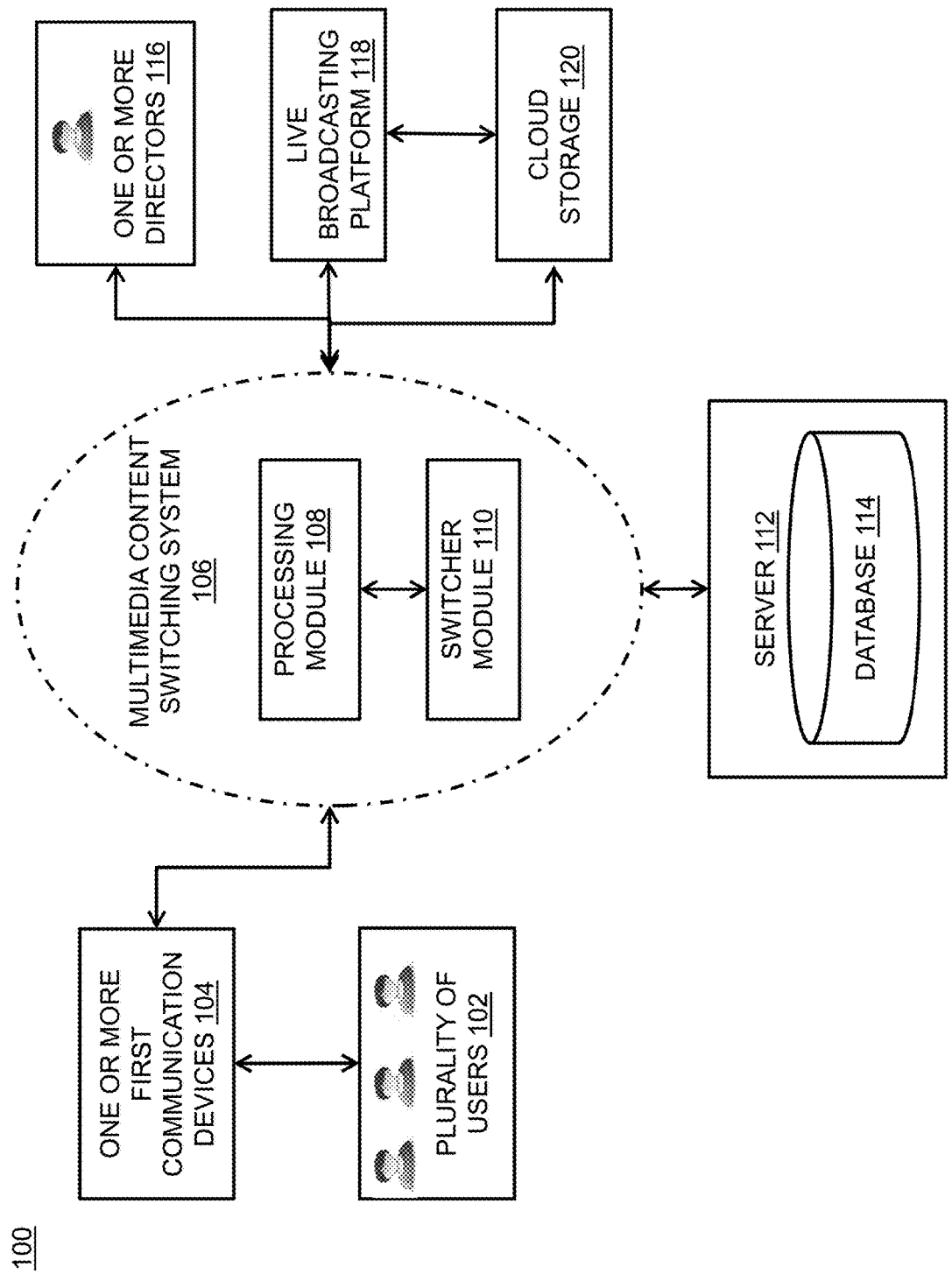
Figure 2B:
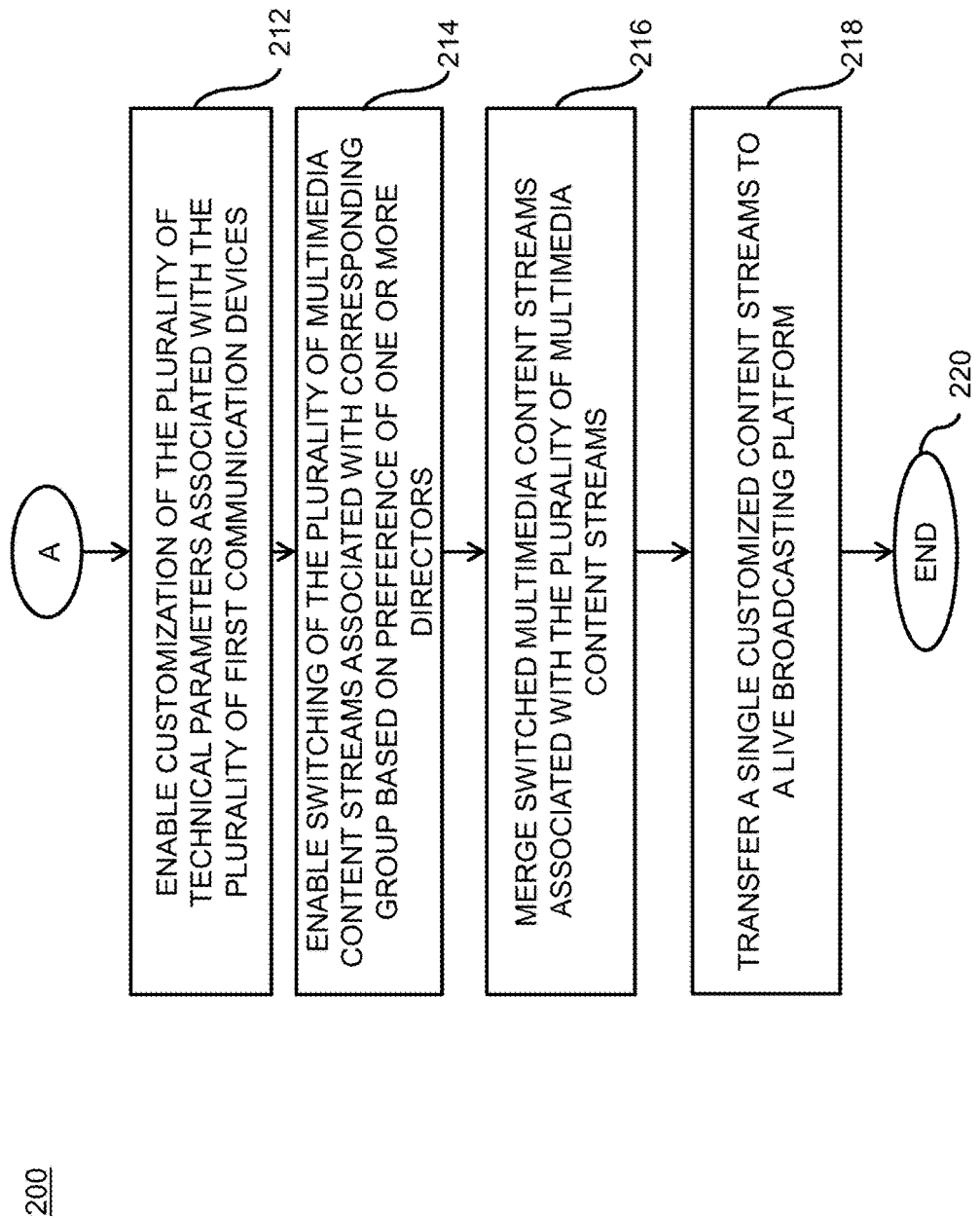

Having thus described the invention in general terms, reference will now be made to the accompanying drawings, which are not necessarily drawn to scale, and wherein:

FIG. 1 illustrates an interactive computing environment for switching of multimedia content in real time, in accordance with various embodiments of the present disclosure;

FIGS. 2A and 2B illustrate a flowchart for switching of multimedia content in real time, in accordance with various embodiments of the present disclosure; and FIG. 3 illustrates a block diagram of a computing device, in accordance with various embodiments of the present disclosure;

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 for switching of multimedia content in real time, in accordance with various embodiments of the present disclosure. The interactive computing environment 100 is configured to provide a setup for switching of multimedia content in real time. Switching of multimedia content corresponds to continuously and selectively enabling and displaying content of a particular multimedia content stream from a plurality of multimedia content streams. The plurality of multimedia content streams is received in real time. Switching provides a single customized multimedia content stream to end user. The single customized multimedia content stream selectively enables content of a multimedia content stream continuously after another multimedia content stream. The single customized multimedia content stream displays a single multimedia content stream of the plurality of multimedia content streams at one time. The interactive computing environment 100 describes an environment suitable for an interactive reception and processing of a multiple channel broadcast. The interactive computing environment 100 is configured to provide a setup for processing and optimizing multimedia content. The interactive computing environment 100 is configured to enable optimized live broadcasting of multimedia content. The interactive computing environment 100 is configured for optimized switching of multimedia content in real time. The interactive computing environment 100 is configured to enable continuous live stream of multimedia content.

The interactive computing environment 100 includes a plurality of users 102, one or more first communication devices 104, and a multimedia content switching system 106. Further, the interactive computing environment 100 includes a live broadcasting platform 118, a cloud storage 120, a database 114, and one or more directors 116. In addition, the multimedia content switching system 106 includes a processing module 108, a switcher module 110, and a server 112. The above stated elements of the interactive computing environment 100 operate coherently and synchronously to enable switching of the plurality of multimedia content streams in real time. The above stated elements of the interactive computing environment 100 collectively enable optimized live multimedia stream. In addition, the above stated elements of the interactive computing environment 100 collectively enable optimized continuous multimedia stream.

The interactive computing environment includes the plurality of users 102. The plurality of users 102 corresponds to any number of person or individual associated with the multimedia content switching system 106. The multimedia content switching system 106 registers each of the plurality of users 102. The multimedia content switching system 106 receives a first set of data from the plurality of users 102. The first set of data includes demographic data of the plurality of users 102. The first set of data includes contact data of the plurality of users 102. The first set of data includes personnel data of the plurality of users 102. In an embodiment of the present disclosure, the first set of data includes any suitable data of the like. The multimedia content switching system 106 creates a unique profile of each of the plurality of users 102. The multimedia content switching system 106 stores data of each of the plurality of users 102 in corresponding unique profile of each of the plurality of users 102.

The interactive computing environment 100 includes the one or more first communication devices 104. The plurality of users 102 are connected with the computing environment 100 through the one or more first communication devices 104. In an embodiment of the present disclosure, the multimedia content switching system 106 fetches a second set of data and a plurality of technical parameters associated with the one or more first communication devices 104 from the plurality of users 102. In another embodiment of the present disclosure, the multimedia content switching system 106 fetches the second set of data and the plurality of technical parameters associated with the one or more first communication devices 104 from a third party database. The second set of data includes information of the one or more first communication devices 104 of the plurality of users 102. The second set of data includes but may not be limited to megapixels, aperture, sensors, pixel density, screen size, screen resolution and IP address. The plurality of technical parameters includes a set of requirements for a video and audio multimedia content of the one or more first communication devices 104 of the plurality of users 102. The plurality of technical parameters includes but may not be limited to video codec, audio code, network bandwidth, maximum bitrate limit and minimum bitrate limit.

Each of the one or more first communication devices 104 includes one or more image capturing module, one or more video capturing module and one or more audio capturing module. In an embodiment of the present disclosure, the one or more first communication devices 104 includes any suitable modules of the like. The function of the one or more first communication devices 104 is to connect the plurality of users 102 with the computing environment 100. Each of the one or more first communication devices 104 comprises of a memory. In general, memory includes computer-storage media in the form of volatile and/or nonvolatile memory. The memory may be removable, non-removable, or a combination thereof. Exemplary hardware devices include solid-state memory, hard drives, optical-disc drives, etc. The memory is coupled with one or more processors. In general, the one or more processor read data from various entities such as memory or I/O components. The one or more processor executes the one or more instructions which are stored in the memory. The one or more processors provide execution method for one or more instructions provided by the multimedia content switching system 106.

The plurality of users 102 records and transmits the plurality of multimedia content streams with facilitation of the one or more first communication devices 104 of one or more events. The one or more first communication devices 104 provides an interface for the plurality of users 102 to interact with the computing environment 100. The plurality of users 102 can interact with the computing environment 100 through more than one device of the one or more first communication devices 104. For example, a person Y at home connects with the computing environment 100 through a desktop computer. But while travelling the same person Y connects with the computing environment 100 with a smartphone device. The one or more first communication devices 104 is associated with a specific type of operating system. The specific type of operating system includes a mac operating system, a windows operating system, an android operating system and the like. In an embodiment of the present disclosure, the operating system corresponds to any suitable operating system.

The one or more first communication devices 104 is a multimedia device. The one or more first communication devices 104 enable the plurality of users 102 to record and transfer the plurality of multimedia content streams of the one or more events. The one or more first communication devices 104 support various multimedia contents. The plurality of users 102 uploads the plurality of multimedia content streams to the multimedia content switching system 106 in real time through the one or more first communication devices 104. In an embodiment of the present disclosure, each of the plurality of multimedia content streams is live multimedia content stream being recorded live on the one or more first communication devices 104 and uploaded to the multimedia content switching system 106. In an embodiment of the present disclosure, the plurality of multimedia content streams is a video stream. In another embodiment of the present disclosure, the plurality of multimedia content streams corresponds to live video stream being recorded by camera of the one or more first communication devices 104. In another embodiment of the present disclosure, the plurality of multimedia content streams corresponds to live multimedia stream being recorded on the one or more first communication devices 104. In yet another embodiment of the present disclosure, the plurality of multimedia content streams is an audio clip. In yet another embodiment of the present disclosure, the plurality of multimedia content streams is a PowerPoint presentation. In yet another embodiment of the present disclosure, the plurality of multimedia content streams is in another suitable format. The multimedia content switching system 106 receives plurality of multimedia content streams from the one or more first communication devices 104.

The plurality of users 102 accesses the one or more first communication devices 104 in real time. Each of the one or more first communication devices 104 includes a dedicated software platform to enable real time switching of multimedia content. The dedicated software platform enables the one or more first communication devices 104 to connect with the multimedia content switching system 106. In an embodiment of the present disclosure, the dedicated software platform is an application installed on the one or more first communication devices 104. In an embodiment of the present disclosure, the one or more first communication devices 104 include a web based browser to connect with the multimedia content switching system 106. In another embodiment of the present disclosure, the one or more first communication devices 104 include any other software platform to connect with the multimedia content switching system 106. In yet another embodiment of the present disclosure, the one or more first communication devices 104 include social media platforms. The one or more first communication devices 104 serve as a platform of the computing environment 100 for receiving information of the plurality of users 102 in real time. The information of the plurality of users 102 is accessible through the dedicated software platform.

The one or more first communication devices 104 is connected to a communication network. The communication network provides a medium for the plurality of users 102 to connect with the multimedia content switching system 106. In an embodiment of the present disclosure, the communication network is an internet connection. In another embodiment of the present disclosure, the communication network is a wireless mobile network. In yet another embodiment of the present disclosure, the communication network is a wired network with a finite bandwidth. In yet another embodiment of the present disclosure, the communication network is a combination of the wireless and the wired network for the optimum throughput of data transmission. In yet another embodiment of the present disclosure, the communication network is an optical fiber high bandwidth network that enables a high data rate with negligible connection drops. The communication network includes a set of channels. Each channel of the set of channels supports a finite bandwidth. Moreover, the finite bandwidth of each channel of the set of channels is based on capacity of the communication network.

The interactive computing environment 100 includes the multimedia content switching system 106. The multimedia content switching system 106 enables switching of the plurality of multimedia content streams in real time. The multimedia content switching system 106 enables optimized live stream of multimedia content. The multimedia content switching system 106 enables continuous stream of multimedia content. The multimedia content switching system 106 receives multimedia content from the one or more first communication devices 104 in real time. The multimedia content switching system 106 enables customization of the plurality of technical parameters associated with the one or more first communication devices 104 based on one or more inputs from the one or more directors 116. The multimedia content switching system 106 enables switching of the plurality of multimedia content streams associated with corresponding group based on a right field of view of a plurality of field of views according the one or more directors 116. The multimedia content switching system 106 enables the one or more directors 116 to switch between various multimedia content streams received from the one or more first communication devices 104 to enable a customized live stream of multimedia content. Switching of multimedia content corresponds to continuously and selectively enabling and displaying content of a particular multimedia content stream from the plurality of multimedia content streams. The plurality of multimedia content streams is received in real time.

The multimedia content switching system 106 merges switched multimedia content streams associated with the plurality of multimedia content streams based on customized technical parameters. The switched multimedia content streams are merged in real time over the cloud storage 120. Switching provides the single customized multimedia content stream to end user. The single customized multimedia content stream selectively enables content of a multimedia content stream continuously after another multimedia content stream. The single customized multimedia content stream provides customized multimedia content customized by the one or more directors 116 of the plurality of multimedia content streams at one time. The multimedia content switching system 106 enables switching of the plurality of multimedia content streams in real time to enable live customized multimedia content stream. The multimedia content switching system 106 receives a set of rules. The set of rules is received from one or more second communication devices based on the one or more inputs of the one or more directors 116. In an embodiment of the present disclosure, the set of rules is a director defined set of rules. In another embodiment of the present disclosure, the set of rules is a pre-defined set of rules. The one or more inputs include but may not be limited to optimal field of view, optimal time, optimal bitrate, optimal aperture, optimal network bandwidth, optimal frame per second and optimal pixel density. The set of rules enables automatic switching of the plurality of multimedia content streams and switching of the plurality of multimedia content streams in defined interval of time.

The processing module 108 creates a plurality of groups. Each of the plurality of groups includes at least two active communication devices of the one or more first communication devices 104. In general, the active communication devices correspond to the one or more first communication devices 104 transmitting live multimedia stream. In an embodiment of the present disclosure, the active communication devices correspond to the one or more first communication devices 104 transmitting multimedia stream in real time. The multimedia content switching system 106 creates the plurality of groups to assign the one or more directors 116 to each of the plurality of groups. The multimedia content switching system 106 creates the plurality of groups to enable the one or more directors 116 to monitor and control the multimedia content streams of the two or more devices in the group.

The multimedia content switching system 106 creates the plurality of groups of two or more active devices of the one or more first communication devices 104 on basis of one or more parameters. The one or more parameters include current location of the active devices. The one or more parameters include type of multimedia content. The one or more parameters include data of user associated with the active devices. The one or more parameters include device information of the active devices. The one or more parameters include a group request received from two or more of the plurality of users 102. In an embodiment of the present disclosure, the one or more parameters include any suitable parameters of the like. The multimedia content switching system 106 enables the one or more directors 116 to switch between various multimedia content streams received from the active devices in a group of the plurality of groups to enable a customized live stream of multimedia content. The multimedia content switching system 106 dynamically updates the active devices of each of the plurality of group. The multimedia content switching system 106 dynamically updates the active devices of each of the plurality of groups to remove non-active devices. The multimedia content switching system 106 dynamically updates the active devices of each of the plurality of groups to include new active devices.

The multimedia content switching system 106 includes the processing module 108. The processing module 108 receives the multimedia content switching system 106 the first set of data, the second set of data and the plurality of technical parameters associated with the one or more first communication devices 104 and the plurality of users 102. The processing module 108 processes the multimedia content switching system 106 the first set of data, the second set of data and the plurality of technical parameters associated with the one or more first communication devices 104 and the plurality of users 102. The processing module 108 receives the first set of data from the one or more first communication devices 104. The processing module 108 receives the first set of data associated with the plurality of users 102. The processing module 108 receives the plurality of multimedia content streams from the one or more first communication devices 104 in real time. The processing module 108 enables the creation of the plurality of group. The processing module 108 enables the creation of the plurality of groups by analyzing the first set of data and the second set of data. The processing module 108 analyzes the first set of data and the second set of data to provide the one or more parameters to enable the creation of the plurality of groups. In an embodiment of the present disclosure, the processing module 108 analyses any suitable data to enable the creation of the plurality of groups.

The processing module 108 receives the plurality of multimedia content streams in real time from two or more active communication devices from the plurality of groups from the plurality of field of views. The plurality of field of views is an open observable area associated with the one or more events obtained through the one or more first communication devices 104. The processing module 108 receives the multimedia content streams in real time from the one or more first communication devices 104 with facilitation of one or more real time streaming techniques. In an embodiment of the present disclosure, the one or more real time streaming techniques include real time messaging protocol. In another embodiment of the present disclosure, the one or more real time streaming techniques includes WebRTC. In yet another embodiment of the present disclosure, the one or more real time streaming techniques includes RTMP and hypertext transfer protocol. In yet another embodiment of the present disclosure, the one or more real time streaming techniques includes any suitable real time streaming technique of the like.

The processing module 108 assigns the one or more directors 116 to each of the plurality of group. Each of the one or more directors 116 is associated with the multimedia content switching system 106 with facilitation of the one or more second communication devices. The one or more second communication devices include smartphone. The one or more second communication devices includes tablet. The one or more second communication devices include laptop. The one or more second communication device include desktop. The one or more second communication devices include cameras. In an embodiment of the present disclosure, the one or more second communication device includes any suitable communication device of the like. The processing module 108 enables the one or more directors 116 of corresponding group to view all the multimedia content streams being received from the active communication devices in real time.

The processing module 108 enables the one or more directors 116 of corresponding group to switch between various multimedia content streams to enable live optimized stream. The processing module 108 enables the one or more directors 116 of corresponding group to switch between various multimedia content streams to enable continuous optimized stream. For example, a group A receives live video stream from 4 different smartphones of four different users. The live video stream is recorded on the video capturing module of smartphone by the corresponding user. The group A includes a director, director X. The director X monitors all 4 video streams received from the 4 different smartphones. The director X switches between the 4 video streams to enables a single customized live video stream. The single customized live video stream plays content of a single video stream from the 4 video streams at a time. The single customized live video stream is provided to a plurality of viewers.

The multimedia content switching system 106 includes the switcher module 110. The switcher module 110 enables the multimedia content switching system 106 to switch between the plurality of multimedia content streams to enable the single customized multimedia content streams for each of the plurality of group. The switcher module 110 receives switch signal by the one or more directors 116 of corresponding group. The switcher module 110 enables the one or more directors 116 of corresponding group to switch between the multimedia content streams received from the two or more active device of corresponding group. The switcher module 110 buffers the plurality of multimedia content streams. The switcher module 110, on receiving the switch signal from the one or more directors 116, detects the right field of view from the plurality of field of views of the plurality of multimedia content streams to switch and merge with previous multimedia stream. The switcher module 110 enables continuous switching between the plurality of multimedia content streams received from the two or more active devices in the group. The switcher module 110 includes sufficient buffer to enable the optimized continuous multimedia stream. The switcher sorts the multimedia content to be switched to determine the right field of view for switching with another multimedia content stream. The switcher module 110 enables smooth transition between the plurality of multimedia content streams to enable continuous multimedia content stream.

The switcher module 110 monitors the bandwidth and communication network of the one or more first communication devices 104 of the plurality of users 102. The switcher module 110 induces a change in bitrate of the content of multimedia stream to adapt to the communication network based on customized technical parameters. The switcher module 110 induces an increase in bitrate of the content of multimedia stream to adapt to a faster communication network. The switcher module 110 induces a decrease in bitrate of the content of multimedia stream to adapt to a slower communication network. In an embodiment of the present disclosure, the switcher module 110 enables any suitable configuration of the one or more first communication devices 104 to adapt to the latency of communication network. Switching of multimedia content streams is not affected by the corresponding bitrate of each of the plurality of multimedia content streams. Switching of the multimedia content streams is not affected by difference in latency of communication network of the one or more first communication devices 104.

The interactive computing environment 100 further includes the server 112 and the database 114. The multimedia content switching system 106 is associated with the server 112. In general, the server 112 is a computer program or device that provides functionality for other programs or devices. The server 112 provides various functionalities, such as sharing data or resources among multiple clients, or performing computation for a client. However, those skilled in the art would appreciate that the multimedia content switching system 106 is connected to more number of servers 112. Furthermore, it may be noted that the server 112 includes the database 114. However, those skilled in the art would appreciate that more number of the servers 112 include more numbers of database 114.

In an embodiment of the present disclosure, the multimedia content switching system 106 is located in the server 112. In another embodiment of the present disclosure, the multimedia content switching system 106 is connected with the server 112. In yet another embodiment of the present disclosure, the multimedia content switching system 106 is a part of the server 112. The server 112 handles each operation and task performed by the multimedia content switching system 106. The server 112 stores one or more instructions for performing the various operations of the multimedia content switching system 106. The server 112 is located remotely from the one or more sellers. The server 112 is associated with the administrator. In general, the administrator manages the different components in the multimedia content switching system 106. The administrator coordinates the activities of the components involved in the multimedia content switching system 106. The administrator is any person or individual who monitors the working of the multimedia content switching system 106 and the server 112 in real time. The administrator monitors the working of the multimedia content switching system 106 and the server 112 through a communication device. The communication device includes the laptop, the desktop computer, the tablet, a personal digital assistant and the like.

The database 114 store different sets of information associated with various components of the multimedia content switching system 106. In general, the database 114 are used to hold general information and specialized data, such as characteristics data of the plurality of users 102, data of the one or more first communication devices 104, data of the one or more directors 114 and the like. For examples, the database 114 include characteristic data of the plurality of users 102 and the pre-defined instructions. The database 114 stores the information of the one or more directors 116, the one or more first communication devices 104, the profiles of the plurality of users 102, demographic information of the plurality of users 102 and the like. The database 114 organize the data using model such as relational models or hierarchical models. Further, the database 114 store data provided by the one or more directors 116.

The interactive computing environment 100 includes the one or more directors 116. The one or more directors 116 correspond to any person or individual associated with the multimedia content switching system 106. The one or more directors 116 are associated with the interactive computing environment 100 with facilitation of the one or more second communication devices. The one or more directors 116 enable switching of the plurality of multimedia content streams in real time. In an embodiment of the present disclosure, the one or more directors 116 are associated with the interactive computing environment 100 with facilitation of any suitable device. Each of the one or more directors 116 is associated with a group of the plurality of groups. The one or more directors 116 enable switching of the plurality of multimedia content streams to provide the single customized multimedia content stream for each of the plurality of group. The one or more directors 116 switch the plurality of multimedia content streams received from the two or more active devices of corresponding group to enable the single customized multimedia stream of each of the plurality of groups.

The multimedia content switching system 106 receives instructions from the one or more directors 116 of corresponding group to switch from one multimedia content stream to another. The multimedia content switching system 106 enables the one or more directors 116 to view and monitor the plurality of multimedia content streams of corresponding group. The multimedia content switching system 106 enables the one or more directors 116 to process and control the plurality of multimedia content streams of corresponding group. The multimedia content switching system 106 enables the one or more directors 116 to switch between the plurality of multimedia content streams of corresponding group to provide a single customized multimedia content stream. In an embodiment of the present disclosure, each of the plurality of groups is associated with one director. In another embodiment of the present disclosure, each of the plurality of groups is associated with plurality of directors.

The interactive computing environment 100 includes the live broadcasting platform 118. The live broadcasting platform 118 enables live broadcast of the customized multimedia content stream to plurality of end user. The plurality of end users accesses the live broadcasting platform 118 with facilitation of suitable communication device. The plurality of end user view live broadcast of multimedia content with facilitation of suitable communication device. The multimedia content switching system 106 provides customized multimedia content streams to the live broadcasting platform 118 in real time. In an embodiment of the present disclosure, the live broadcasting platform 118 is associated with the multimedia content switching system 106. In another embodiment of the present disclosure, the live broadcasting platform 118 is a third party platform. In an embodiment of the present disclosure, the live broadcasting platform 118 is a software application. In another embodiment of the present disclosure, the live broadcasting platform 118 is a website. In yet another embodiment of the present disclosure, the live broadcasting platform 118 is a digital television platform. In yet another embodiment of the present disclosure, the live broadcasting platform 118 is a suitable display device. In yet another embodiment of the present disclosure, the live broadcasting platform 118 is any suitable device of the like.

In addition, the interactive computing environment 100 includes the cloud storage 120. In general, cloud storage corresponds to a service model in which data is maintained, managed, backed up remotely and made available to users over a network. The cloud storage 120 stores the plurality of multimedia content streams received from the two or more active device of each of the plurality of group. The cloud storage 120 stores the customized multimedia content stream enables by the multimedia content switching system 106. The cloud storage 120 stores the data of the plurality of users 102, the one or more first communication devices 104 and the one or more directors 116. In an embodiment of the present disclosure, the interactive computing environment 100 includes any suitable storage medium of the like.

FIGS. 2A and 2B illustrate a flow chart 200 of the method for real time switching of multimedia content, in accordance with various embodiments of the present disclosure. It may be noted that in order to explain the method steps of the flowchart 200, references will be made to the elements explained in FIG. 1. The flow chart 200 starts at step 202. At step 204, the multimedia content switching system 106 receives the first set of data associated with the plurality of users 102. At step 206, the multimedia content switching system 106 fetches the second set of data and the plurality of technical parameters associated with the one or more first communication devices 104. At step 208, the multimedia content switching system 106 obtains the plurality of multimedia content streams associated with the one or more events. At step 210, the multimedia content switching system 106 create the plurality of groups associated with the plurality of multimedia content streams based on the one or more events. At step 212, the multimedia content switching system 106 enables customization of the plurality of technical parameters associated with the plurality of first communication devices 104. At step 214, the multimedia content switching system 106 enables switching of the plurality of multimedia content streams associated with corresponding group based on preference of the one or more directors 116. At step 216, the multimedia content switching system 106 merges switched multimedia content streams associated with the plurality of multimedia content streams. At step 218, the multimedia content switching system 106 transfers the single customized content streams to the live broadcasting platform 118.

The flow chart 200 terminates at step 220. It may be noted that the flowchart 200 is explained to have above stated process steps; however, those skilled in the art would appreciate that the flowchart 200 may have more/less number of process steps which may enable all the above stated embodiments of the present disclosure.

FIG. 3 illustrates the block diagram of a computing device 300, in accordance with various embodiments of the present disclosure. The computing device 300 includes a bus 302 that directly or indirectly couples the following devices: memory 304, one or more processors 206, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 3 is merely illustrative of an exemplary computing device 300 that can be used in connection with one or more embodiments of the present invention. Distinction is not made between such categories as "workstation," "server," "laptop," "hand-held device," etc., as all are contemplated within the scope of FIG. 3 and reference to "computing device."

The computing device 300 typically includes a variety of computer-readable media. The computer-readable media can be any available media that can be accessed by the computing device 300 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data.

The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 300. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The computing device 300 includes one or more processors that read data from various entities such as memory 304 or I/O components 312. The one or more presentation components 308 present data indications to a user or other device. Exemplary presentation components include a display device, speaker, printing component, vibrating component, etc. The one or more I/O ports 310 allow the computing device 300 to be logically coupled to other devices including the one or more I/O components 312, some of which may be built in. Illustrative components include a microphone, joystick, game pad, satellite dish, scanner, printer, wireless device, etc.

The present disclosure has numerous disadvantages over the prior art. The present disclosure provides a method and system to enable customized multimedia content stream in real time. The disclosure provides the method and system to enable continuous multimedia content stream by switching between the plurality of multimedia content streams. The disclosure provides the method and system to enable live broadcast of the customized multimedia content stream. The disclosure provides a cost efficient and time saving solution for live broadcasting of multimedia content stream. The disclosure provides the method and system to enable a director to efficiently control and monitor live broadcast of multimedia content stream.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for real time switching of multimedia content, the computer-implemented method comprising:
receiving, at a multimedia content switching system with a processor, a first set of data associated with a plurality of users, wherein the first set of data is received in real time;
fetching, at the multimedia content switching system with the processor, a second set of data and a plurality of technical parameters associated with one or more first communication devices, wherein the second set of data is fetched in real time;
obtaining, at the multimedia content switching system with the processor, a plurality of multimedia content streams associated with one or more events through the one or more first communication devices from a plurality of field of views, wherein the plurality of field of views is an open observable area associated with the one or more events obtained through the one or more first communication devices, wherein the plurality of multimedia content streams is obtained in real time;
creating, at the multimedia content switching system with the processor, a plurality of groups associated with the plurality of multimedia content streams based on the one or more events; wherein the plurality of groups is created in real time;
enabling, at the multimedia content switching system with the processor, customization of the plurality of technical parameters associated with the one or more first communication devices based on one or more inputs from one or more directors, wherein the one or more directors customize the plurality of technical parameters in real time over one or more second communication devices;
enabling switching, at the multimedia content switching system with the processor, of the plurality of multimedia content streams associated with corresponding group based on a preferred field of view of the plurality of field of views according the one or more directors, wherein the plurality of multimedia content streams switched in real time over the one or more second communication devices;
merging, at the multimedia content switching system with the processor, switched multimedia content streams associated with the plurality of multimedia content streams based on customized technical parameters, wherein the switched multimedia content streams are merged in real time over a cloud storage associated with the multimedia, content switching system with the processor; and
transferring, at the multimedia content switching system with the processor, a single customized multimedia content stream to a live broadcasting platform, wherein the single customized multimedia content stream is broadcasted uninterrupted in real time, wherein the single customized multimedia content stream is stored to the cloud storage in real time.

2. The computer-implemented method as recited in claim 1, wherein the multimedia content switching system is associated with a server, wherein the server provides a plurality of functionalities, wherein the plurality of functionalities comprises data sharing, resources sharing, computation performing, task performing, instruction storing, and operation performing, wherein the server comprises a database, wherein the database comprises information associated with the multimedia content switching system.

3. The computer-implemented method as recited in claim 1, wherein the first set of data comprises user name, user contact number, user email address, user location and user communication device, wherein the first set of data is received from each of the plurality of users, wherein communication network provides a medium for the plurality of users to connect with the multimedia content switching system through the one or more first communication devices.

4. The computer-implemented method as recited in claim 1, wherein the second set of data comprises megapixels, aperture, sensors, pixel density, screen size, screen resolution and IP address, wherein the plurality of technical parameters comprises video codec, audio code, network bandwidth, maximum bitrate limit and minimum bitrate limit.

5. The computer-implemented method as recited in claim 1, wherein the multimedia content switching system comprises a processing module, wherein the processing module creates the plurality of groups, wherein each of the plurality of groups comprises at least two active first communication devices of the one or more first communication devices, wherein the active first communication devices transmit multimedia content stream in real time.

6. The computer-implemented method as recited in claim 1, further comprising assigning, at the multimedia content streams system with the processor, the one or more directors to each of the plurality of groups, wherein each of the one or more directors monitors and controls the plurality of multimedia content streams of at least two active communication devices in corresponding group of the plurality of groups through the one or more second communication devices, wherein the one or more directors customize the plurality of technical parameters to enable adaptive bitrate streaming based on the one or more inputs.

7. The computer-implemented method as recited in claim 1, further comprising receiving, at the multimedia content streams system with the processor, a set of rules, wherein the set of rules is received from the one or more second communication devices based on the one or more inputs of the one or more directors, wherein the one or more inputs comprises optimal field of view, optimal time, optimal bitrate, optimal aperture, optimal network bandwidth, optimal frame per second and optimal pixel density, wherein the set of rules enables automatic switching of the plurality of multimedia content streams and switching of the plurality of multimedia content streams in defined interval of time.

8. The computer-implemented method as recited in claim 1, wherein the multimedia content switching system comprises the switcher module, wherein the switcher module buffers the plurality of multimedia content streams, wherein the switcher module receives switch signal from the one or more directors, wherein the switcher module enables continuous switching between the plurality of multimedia content streams received from at least two active first communication devices in corresponding group of the plurality of groups, wherein the switcher module comprises sufficient buffer to enable the optimized continuous multimedia stream, wherein the switcher module induces a change in bitrate of the plurality of multimedia content streams to adapt to the communication network.

9. The computer-implemented method as recited in claim 1, further comprising detecting, at the multimedia content switching system with the processor, the right field of view from the plurality of field of views of the plurality of multimedia content streams to switch and merge with previous multimedia stream, wherein the multimedia content switching system enables smooth transition between the plurality of multimedia content streams to enable continuous multimedia content stream, wherein the multimedia content switching system.

10. The computer-implemented method as recited in claim 1, the live broadcasting platform receives the single customized multimedia content stream from the multimedia content switching system, wherein the live broadcasting platform enables live broadcast of the single customized multimedia content stream to a plurality of end user, wherein the plurality of end users accesses the live broadcasting platform with facilitation of communication device, wherein the multimedia content switching system provides customized multimedia content streams to the live broadcasting platform in real time.

11. A computer system comprising: one or more processors; and
a memory coupled to the one or more processors, the memory for storing instructions which, when executed by the one or more processors, cause the one or more processors to perform a method for real time switching of multimedia content, the method comprising:
receiving, at a multimedia content switching system, a first set of data associated with a plurality of users, wherein the first set of data is received in real time;
fetching, at the multimedia content switching system, a second set of data and a plurality of technical parameters associated with one or more first communication devices, wherein the second set of data is fetched in real time;
obtaining, at the multimedia content switching system, a plurality of multimedia content streams associated with one or more events through the one or more first communication devices from a plurality of field of views, wherein the plurality of field of views is an open observable area associated with the one or more events obtained through the one or more first communication devices, wherein the plurality of multimedia content streams is obtained in real time;
creating, at the multimedia content switching system, a plurality of groups associated with the plurality of multimedia content streams based on the one or more events; wherein the plurality of groups is created in real time;
enabling, at the multimedia content switching system, customization of the plurality of technical parameters associated with the one or more first communication devices based on one or more inputs from one or more directors, wherein the one or more directors customize the plurality of technical parameters in real time over one or more second communication devices;
enabling switching, at the multimedia content switching system, of the plurality of multimedia content streams associated with corresponding group based on a preferred field of view of the plurality of field of views of the one or more directors, wherein the plurality of multimedia content streams switched in real time over the one or more second communication devices;
merging, at the multimedia content switching system, switched multimedia content streams associated with the plurality of multimedia content streams based on customized technical parameters, wherein the switched multimedia content streams are merged in real time over a cloud storage associated with the multimedia content switching system with the processor; and
transferring, at the multimedia content switching system, a single customized multimedia content stream to a live broadcasting platform, wherein the single customized multimedia content stream is broadcasted uninterrupted in real time, wherein the single customized multimedia content stream is stored to the cloud storage in real time.

12. The computer system as recited in claim 1, wherein the multimedia content switching system is associated with a server, wherein the server provides a plurality of functionalities, wherein the plurality of functionalities comprises data sharing, resources sharing, computation performing, task performing, instruction storing, and operation performing, wherein the server comprises a database, wherein the database comprises information associated with the multimedia content switching system.

13. The computer system as recited in claim 1, wherein the first set of data comprises user name, user contact number, user email address, user location and user communication device, wherein the first set of data is received from each of the plurality of users, wherein communication network provides a medium for the plurality of users to connect with the multimedia content switching system through the one or more first communication devices.

14. The computer system as recited in claim 1, wherein the second set of data comprises megapixels, aperture, sensors, pixel density, screen size, screen resolution and IF address, wherein the plurality of technical parameters comprises video codec, audio code, network bandwidth, maximum bitrate limit and minimum bitrate limit.

15. The computer system as recited in claim 1, wherein the multimedia content switching system comprises a processing module, wherein the processing module creates the plurality of groups, wherein each of the plurality of groups comprises at least two active first communication devices of the one or more first communication devices, wherein the active first communication devices transmit multimedia content stream in real time.

16. The computer system as recited in claim 1, further comprising assigning, at the multimedia content streams system, the one or more directors to each of the plurality of groups, wherein each of the one or more directors monitors and controls the plurality of multimedia content streams of at least two active communication devices in corresponding group of the plurality of groups through the one or more second communication devices, wherein the one or more directors customize the plurality of technical parameters to enable adaptive bitrate streaming based on the one or more inputs.

17. The computer system as recited in claim 1, wherein the multimedia content switching system comprises the switcher module, wherein the switcher module buffers the plurality of multimedia content streams, wherein the switcher module receives switch signal from the one or more directors, wherein the switcher module enables continuous switching between the plurality of multimedia content streams received from at least two active first communication devices in corresponding group of the plurality of groups, wherein the switcher module comprises sufficient buffer to enable the optimized continuous multimedia stream, wherein the switcher module induces a change in bitrate of the plurality of multimedia content streams to adapt to the communication network.

18. The computer system as recited in claim 1, further comprising detecting, at the multimedia content switching system, the right field of view from the plurality of field of views of the plurality of multimedia content streams to switch and merge with previous multimedia stream, wherein the multimedia content switching system enables smooth transition between the plurality of multimedia content streams to enable continuous multimedia content stream, wherein the multimedia content switching system.

19. The computer system as recited in claim 1, the live broadcasting platform receives the single customized multimedia content stream from the multimedia, content switching system, wherein the live broadcasting platform enables live broadcast of the single customized multimedia content stream to a plurality of end user, wherein the plurality of end users accesses the live broadcasting platform with facilitation of communication device, wherein the multimedia content switching system provides customized multimedia content streams to the live broadcasting platform in real time.

20. A non-transitory computer-readable storage medium encoding computer executable instructions that, when executed by at least one processor, performs a method for real time switching of multimedia content, the method comprising:

receiving, at a computing device, a first set of data associated with a plurality of users, wherein the first set of data is received in real time;

fetching, at the computing device, a second set of data and a plurality of technical parameters associated with one or more first communication devices, wherein the second set of data is fetched in real time;

obtaining, at the computing device, a plurality of multimedia content streams associated with one or more events through the one or more first communication devices from a plurality of field of views, wherein the plurality of field of views is an open observable area associated with the one or more events obtained through the one or more first communication devices, wherein the plurality of multimedia content streams is obtained in real time;

creating, at the computing device, a plurality of groups associated with the plurality of multimedia content streams based on the one or more events; wherein the plurality of groups is created in real time;

enabling, at the computing device, customization of the plurality of technical parameters associated with the one or more first communication devices based on one or more inputs from one or more directors, wherein the one or more directors customize the plurality of technical parameters in real time over one or more second communication devices;

enabling switching, at the computing device, of the plurality of multimedia content streams associated with corresponding group based on a preferred field of view of the plurality of field of views of the one or more directors, wherein the plurality of multimedia content streams switched in real time over the one or more second communication devices;

merging, at the computing device, switched multimedia content streams associated with the plurality of multimedia content streams based on customized technical parameters, wherein the switched multimedia content streams are merged in real time over a cloud storage associated with the multimedia content switching system with the processor; and transferring, at the computing device, a single customized multimedia content stream to a live broadcasting platform, wherein the single customized multimedia content stream is broadcasted uninterrupted in real time, wherein the single customized multimedia content stream is stored to the cloud storage in real time.

* * * * *